(12) United States Patent
Ralph-Smith

(10) Patent No.: US 10,663,080 B2
(45) Date of Patent: May 26, 2020

(54) LIQUID LEVEL CONTROL DEVICE

(71) Applicant: Jason Ralph-Smith, Hampshire (GB)

(72) Inventor: Jason Ralph-Smith, Hampshire (GB)

( * ) Notice: Subject to any disclaimer, the term of this patent is extended or adjusted under 35 U.S.C. 154(b) by 161 days.

(21) Appl. No.: 15/816,599

(22) Filed: Nov. 17, 2017

(65) Prior Publication Data

US 2018/0135774 A1 May 17, 2018

(30) Foreign Application Priority Data

Nov. 17, 2016 (GB) .................................... 1619464.9

(51) Int. Cl.
*F16K 33/00* (2006.01)
*G05D 9/02* (2006.01)
(Continued)

(52) U.S. Cl.
CPC ............ *F16K 33/00* (2013.01); *A01G 27/003* (2013.01); *F16K 21/18* (2013.01); *F16K 24/044* (2013.01);
(Continued)

(58) Field of Classification Search
CPC ..... F16K 3/24; F16K 3/18; F16K 3/22; F16K 3/28; F16K 3/34; F16K 33/00;
(Continued)

(56) References Cited

U.S. PATENT DOCUMENTS

| | | | |
|---|---|---|---|
| 4,535,800 A * | 8/1985 | Leech ..................... | E03F 1/006 137/192 |
| 4,864,771 A | 9/1989 | Fah | |

(Continued)

FOREIGN PATENT DOCUMENTS

| | | |
|---|---|---|
| AU | 2004200168 A1 | 2/2004 |
| CN | 1504850 A | 6/2004 |

(Continued)

OTHER PUBLICATIONS https://www.autopot.co.uk/watering-systems/aquavalve-accessories.

(Continued)

*Primary Examiner* — Hailey K. Do
(74) *Attorney, Agent, or Firm* — Renner, Otto, Boisselle & Sklar, LLP

(57) ABSTRACT

There is provided a liquid level control device (20) for location in a vessel to control the liquid level in the vessel. The liquid level control device (20) comprises: a first chamber (22) including: an opening (26) to allow movement of liquid between the first chamber (22) and the vessel; a vent (28) to allow egress of air from the first chamber (22); and an inlet (30) connectable to a liquid source (34); a first flow controller including a first float (36) arranged in the first chamber (22) such that the flow of liquid into the first chamber (22) raises the first float (36) and displaces air in the first chamber (22) via the vent (28), the first flow controller including a first closure member (40) movable to selectively close and open the inlet (30), the first float (36) further arranged in the first chamber (22) such that, in use, when the first float (36) is at a first position when the liquid level in the first chamber (22) is at or below a first predetermined level, the first float (36) positions the first closure member (40) to open the inlet (30) to allow liquid into the first chamber (22) via the inlet (30), and when the first float (36) is at a second position when the liquid level in the first chamber (22) is at or above a second predetermined level, the first float (36) positions the first closure member (40) to close the inlet (30) to block liquid from entering into the first chamber (22) via the inlet (30); and a second flow controller including a second float (42) and further including a second (Continued)

closure member (46) movable to selectively close and open the vent (28), the second float (42) arranged such that, in use, when the second float (42) is in a first position, the second float (42) positions the second closure member (46) to close the vent (28) to block air from flowing from the first chamber (22) via the vent (28) to escape to atmosphere, and when the second float (42) is in a second position, the second float (42) positions the second closure member (46) to open the vent (28) to allow air to flow from the first chamber (22) via the vent (28) to escape to atmosphere, wherein the first and second floats (42) are arranged such that, in use, when the first float (36) is in its second position and the second float (42) is in its first position, air is trapped in the first chamber (22) to maintain the liquid level in the first chamber (22) at a level so as to maintain the first float (36) in its second position, and wherein the second float (42) includes a hollow body with an internal chamber (48) for storing a substance (54), the hollow body configured so that the internal chamber (48) is accessible from the exterior of the hollow body to permit addition and removal of a substance (54) into and from the internal chamber (48), the second float (42) configured to have a variable weight modifiable through selective addition and removal of a substance (54) into and from the internal chamber (48).

16 Claims, 3 Drawing Sheets

(51) Int. Cl.
    *F16K 31/18*     (2006.01)
    *F16K 24/04*     (2006.01)
    *F16K 21/18*     (2006.01)
    *A01G 27/00*     (2006.01)
    *F16K 31/22*     (2006.01)

(52) U.S. Cl.
    CPC ............ *F16K 24/048* (2013.01); *F16K 31/18* (2013.01); *F16K 31/22* (2013.01); *G05D 9/02* (2013.01); *Y10T 137/053* (2015.04); *Y10T 137/7384* (2015.04); *Y10T 137/7404* (2015.04); *Y10T 137/7485* (2015.04)

(58) Field of Classification Search
    CPC ...... F16K 21/18; F16K 24/042; F16K 24/044; F16K 24/048; F16K 31/18; F16K 31/20; F16K 31/22; Y10T 137/7404; Y10T 137/7485; Y10T 137/053; Y10T 137/6004; Y10T 137/2965; Y10T 137/3068; Y10T 137/3074; Y10T 137/3099; Y10T 137/7384; Y10T 137/742; Y10T 137/7439; G05D 9/02; A01G 27/003
See application file for complete search history.

(56) References Cited

U.S. PATENT DOCUMENTS

2005/0115149 A1    6/2005   Tanaka
2014/0352811 A1   12/2014   Jones et al.

FOREIGN PATENT DOCUMENTS

JP         2002345342 A    12/2002
WO         9920100 A1     4/1999

OTHER PUBLICATIONS

Company brochure—AutoPotTM watering systems, Growing made simple, Autopot Global Ltd, 2012.
Company brochure—AutoPotTM watering systems, Growing within your grasp, Autopot Global Ltd, 2014.

* cited by examiner

LIQUID LEVEL CONTROL DEVICE

PRIORITY

This application claims priority of GB Application No. 1619464.9 filed Nov. 17, 2017, which is hereby incorporated herein by reference.

FIELD OF THE INVENTION

This invention relates to a liquid level control device, and to a method of configuring a liquid level control device.

BACKGROUND

It is known to use automatic watering devices to water plants without supervision.

SUMMARY OF THE INVENTION

According to a first aspect of the invention, there is provided a liquid level control device for location in a vessel to control the liquid level in the vessel, the liquid level control device comprising:

a first chamber including: an opening (which is preferably located at or adjacent the base of the first chamber) to allow movement of liquid between the first chamber and the vessel; a vent to allow egress of air from the first chamber; and an inlet connectable to a liquid source;

a first flow controller including a first float arranged in the first chamber such that the flow of liquid into the first chamber raises the first float and displaces air in the first chamber via the vent, the first flow controller including a first closure member movable to selectively close and open the inlet, the first float further arranged in the first chamber such that, in use, when the first float is at a first position when the liquid level in the first chamber is at or below a first predetermined level, the first float positions the first closure member to open the inlet to allow liquid into the first chamber via the inlet, and when the first float is at a second position when the liquid level in the first chamber is at or above a second predetermined level, the first float positions the first closure member to close the inlet to block liquid from entering into the first chamber via the inlet; and a second flow controller including a second float and further including a second closure member movable to selectively close and open the vent, the second float arranged such that, in use, when the second float is in a first position, the second float positions the second closure member to close the vent to block air from flowing from the first chamber via the vent to escape to atmosphere, and when the second float is in a second position, the second float positions the second closure member to open the vent to allow air to flow from the first chamber via the vent to escape to atmosphere, wherein the first and second floats are arranged such that, in use, when the first float is in its second position and the second float is in its first position, air is trapped in the first chamber to maintain the liquid level in the first chamber at a level so as to maintain the first float in its second position, and wherein the second float includes a hollow body with an internal chamber for storing a substance, the hollow body configured so that the internal chamber is accessible from the exterior of the hollow body to permit addition and removal of a substance into and from the internal chamber, the second float configured to have a variable weight modifiable through selective addition and removal of a substance into and from the internal chamber.

The inclusion of the first chamber, the first flow controller and the second flow controller in the liquid level control device of the invention provides cyclic control over the liquid level in the vessel, without requiring electricity, mains water pressure, pumps, and timers. Furthermore the liquid level control device of the invention is suitable for use with a liquid source (e.g. a reservoir or tank) arranged to supply liquid to the inlet by way of gravity pressure.

The cyclic control over the liquid level in the vessel can be configured to provide cyclic watering of a plant located in the vessel or in liquid communication with the vessel, e.g. to ensure that the plant is not constantly sat in water.

The configuration of the second float in the foregoing manner (i.e. to have a variable weight modifiable through selective addition and removal of a substance into and from the internal chamber) means that the variable weight of the second float is modified through addition and removal of a substance into and from the internal chamber. This in turn allows the modification of the functionality of the second flow controller in order to modify the cyclic control over the liquid level of the vessel, thus enabling the liquid level control device to increase the controllable range of liquid level in the vessel in order to suit a range of plants with different water consumption requirements. This extends the capability of the liquid level control device of the invention with zero or minimal increase in the number of parts used, thus minimising overall cost and increasing reliability.

In addition the aforementioned modification of the variable weight of the second float can be advantageously carried out when the liquid level control device is located in-situ and when the liquid level control device is in its assembled state, i.e. there is no requirement to disassemble the components of the liquid level control device in order to modify the functionality of the second float. This is particularly beneficial when it is desirable to minimally interrupt the operation of the liquid level control device to control the liquid level in the vessel, or when it is difficult to remove the liquid level control device, e.g. because the liquid level control device is integrated into a larger system.

Furthermore configuring the second float in the foregoing manner (i.e. to have a variable weight modifiable through selective addition and removal of a substance into and from the internal chamber) not only means that there is no requirement to increase the overall size of the liquid level control device to accommodate any added substance, unlike the case if the added substance is attached to the exterior of the second float, but also ensures the maintenance of the modified weight of the second float through reliable storage of any added substance in the internal chamber.

In contrast configuring the second float to have a fixed weight would limit the functionality of the second flow controller and thereby limit the range of liquid level in the vessel that is controllable by the liquid level control device. Thus such a liquid level control device would be limited to use with a limited range of plants. Under such circumstances, in order to meet a different water consumption requirement of a different plant, it would be necessary to either manufacture a completely new second float or a completely new liquid level control device, which would not be as cost-efficient as the invention. Alternatively multiple liquid level control devices could be utilised to meet a different water consumption requirement of a different plant, but the use of multiple liquid level control devices greatly increases the number of parts which in turn increases overall cost and reduces reliability.

In addition configuring the second float to have a fixed weight would require the disassembly of the liquid level control device and/or the removal of the liquid level control device from the vessel so as to enable the installation of a different second float with a different fixed weight in order to meet a different water consumption requirement of a different plant.

In a preferred embodiment of the invention the substance may be a solid or a liquid (such as water).

Configuring the second float in the foregoing manner (i.e. to have a variable weight modifiable through selective addition and removal of a substance into and from the internal chamber) allows the use of a liquid substance to modify the variable weight of the second float, since the liquid substance can be reliably stored in the internal chamber.

The use of a liquid substance for addition and removal into and from the internal chamber is advantageous in that the required amount of liquid is easily obtainable from the vessel or the liquid source. The use of a liquid substance for addition and removal into and from the internal chamber is further advantageous that the use of a liquid substance enables the fine-tuning of the variable weight of the second float to a desired level in comparison to using a solid substance, since it is more straightforward to vary the amount of a liquid substance than it is to vary the amount of a solid substance.

In embodiments of the invention, the internal chamber of the second float may be divided into a plurality of sub-chambers, the size of each sub-chamber corresponding to a target amount of substance to be stored in or removed from the corresponding sub-chamber to obtain a respective target change in weight of the second float.

In such embodiments in which the substance is a liquid, the size of each sub-chamber may correspond to a target amount of liquid to be stored in or removed from the corresponding sub-chamber to obtain a respective target change in weight of the second float.

The provision of the plurality of sub-chambers in the second float provides a user with a reliable means of modifying the weight of the second float to a target level, without requiring measuring equipment to determine the correct amount of substance to be stored in or removed from the internal chamber, or without resorting to a time-consuming trial and error approach.

In further embodiments of the invention, the second float may include at least one visual indicator corresponding to a target amount of substance to be stored in or removed from the internal chamber to obtain a respective target change in weight of the second float.

In such embodiments in which the substance is a liquid, the or each visual indicator may correspond to a target amount of liquid to be stored in or removed from the internal chamber to obtain the respective target change in weight of the second float.

The provision of the or each visual indicator in the second float provides a user with a reliable means of modifying the weight of the second float to a target level, without requiring measuring equipment to determine the correct amount of substance to be stored in or removed from the internal chamber, or without resorting to a time-consuming trial and error approach.

The or each visual indicator may be formed in or on a wall of the internal chamber. For example, the or each visual indicator may be in the form of a protrusion formed on a wall of the internal chamber. An example of a suitable protrusion may be a rib formed on the wall of the internal chamber.

In still further embodiments of the invention, the second float may include a cover member configurable to selectively provide and block access to the internal chamber from the exterior of the hollow body.

Exposure of the contents of the internal chamber to the external environment results in the risk of unwanted addition and removal of substance into and from the internal chamber of the second float during the use of the liquid level control device to control the liquid level in the vessel. For example, rainwater may fall into the internal chamber, or water may be evaporated from the internal chamber. Thus, in order to ensure the proper operation of the liquid level control device, it would be necessary to constantly check the contents of the internal chamber, which negates the advantage arising from the ability of the liquid level control device to control the liquid level in the vessel without supervision.

On the other hand the provision of the aforementioned cover member in the second float prevents such unwanted addition and removal of substance into and from the internal chamber, thus obviating the need to constantly monitor the contents of the internal chamber.

In such embodiments, the hollow body may be configured to seal the internal chamber when the cover member is configured to block access to the internal chamber from the exterior of the hollow body.

Such sealing may be carried out by, for example, use of a separate seal between the cover member and hollow body, or dimensioning the cover member and hollow body to provide a press fit between the cover member and hollow body.

Optionally the liquid level control device may further include a substance stored in the internal chamber of the hollow body of the second float, the substance configured to be wholly or partly removable from the internal chamber to reduce the weight of the second float.

According to a second aspect of the invention, there is provided a method of configuring a liquid level control device for location in a vessel to control the liquid level in the vessel, the liquid level control device comprising:
  a first chamber including: an opening to allow movement of liquid between the first chamber and the vessel; a vent to allow egress of air from the first chamber; and an inlet connectable to a liquid source;
  a first flow controller including a first float arranged in the first chamber such that the flow of liquid into the first chamber raises the first float and displaces air in the first chamber via the vent, the first flow controller including a first closure member movable to selectively close and open the inlet, the first float further arranged in the first chamber such that, in use, when the first float is at a first position when the liquid level in the first chamber is at or below a first predetermined level, the first float positions the first closure member to open the inlet to allow liquid into the first chamber via the inlet, and when the first float is at a second position when the liquid level in the first chamber is at or above a second predetermined level, the first float positions the first closure member to close the inlet to block liquid from entering into the first chamber via the inlet; and
  a second flow controller including a second float and further including a second closure member movable to selectively close and open the vent, the second float arranged such that, in use, when the second float is in a first position, the second float positions the second closure member to close the vent to block air from flowing from the first chamber via the vent to escape to atmosphere, and when the second float is in a second position, the second float positions the second closure member to open the vent to allow air to flow from the first chamber via the vent to escape to atmosphere, wherein the first and second floats are arranged such that, in use, when the first float is in its second position and the second float is in its first position, air is trapped in the first chamber to maintain the liquid level in the first chamber at a level so as to maintain the first float in its second position, and wherein the second float includes a hollow body with an internal chamber for storing a substance, wherein the method comprises the steps of:

configuring the hollow body so that the internal chamber is accessible from the exterior of the hollow body to permit addition and removal of a substance into and from the internal chamber;

configuring the second float to have a variable weight modifiable through selective addition and removal of a substance into and from the internal chamber;

accessing the internal chamber from the exterior of the hollow body; and modifying the weight of the second float by adding or removing a substance into or from the internal chamber.

The features and advantages of the liquid level control device of the first aspect of the invention and its embodiments apply mutatis mutandis to the method of the second aspect of the invention and its embodiments.

Optionally the substance may be a solid or a liquid (such as water).

When the internal chamber of the second float is divided into a plurality of sub-chambers, the size of each sub-chamber corresponding to a target amount of substance to be stored in or removed from the corresponding sub-chamber to obtain a respective target change in weight of the second float, the method may include the step of: modifying the weight of the second float by adding or removing a substance into or from at least one sub-chamber in an amount corresponding to the size of the or each corresponding sub-chamber.

When the size of each sub-chamber corresponds to a target amount of liquid to be stored in or removed from the corresponding sub-chamber to obtain a respective target change in weight of the second float, the method may include the step of: modifying the weight of the second float by adding or removing liquid into or from at least one sub-chamber in an amount corresponding to the size of the or each corresponding sub-chamber.

When the second float includes at least one visual indicator corresponding to a target amount of substance to be stored in or removed from the internal chamber to obtain a respective target change in weight of the second float, the method may include the step of: modifying the weight of the second float by adding or removing a substance into or from the internal chamber in an amount corresponding to at least one visual indicator.

When the or each visual indicator corresponds to a target amount of liquid to be stored in or removed from the internal chamber to obtain the respective target change in weight of the second float, the method may include the step of: modifying the weight of the second float by adding or removing liquid into or from the internal chamber in an amount corresponding to at least one visual indicator.

The or each visual indicator may be formed in or on a wall of the internal chamber.

The or each visual indicator may be in the form of a protrusion formed on a wall of the internal chamber.

The method may include the step of configuring a cover member to selectively provide and block access to the internal chamber from the exterior of the hollow body. In such embodiments, the method may include the step of sealing the internal chamber when the cover member is configured to block access to the internal chamber from the exterior of the hollow body.

According to a third aspect of the invention, there is provided a liquid level control device for location in a vessel to control the liquid level in the vessel, the liquid level control device comprising:

a first chamber including: an opening to allow movement of liquid between the first chamber and the vessel; a vent to allow egress of air from the first chamber; and an inlet connectable to a liquid source;

a first flow controller including a first float arranged in the first chamber such that the flow of liquid into the first chamber raises the first float and displaces air in the first chamber via the vent, the first flow controller including a first closure member movable to selectively close and open the inlet, the first float further arranged in the first chamber such that, in use, when the first float is at a first position when the liquid level in the first chamber is at or below a first predetermined level, the first float positions the first closure member to open the inlet to allow liquid into the first chamber via the inlet, and when the first float is at a second position when the liquid level in the first chamber is at or above a second predetermined level, the first float positions the first closure member to close the inlet to block liquid from entering into the first chamber via the inlet; and a second flow controller including a second float and further including a second closure member movable to selectively close and open the vent, the second float arranged such that, in use, when the second float is in a first position, the second float positions the second closure member to close the vent to block air from flowing from the first chamber via the vent to escape to atmosphere, and when the second float is in a second position, the second float positions the second closure member to open the vent to allow air to flow from the first chamber via the vent to escape to atmosphere, wherein the first and second floats are arranged such that, in use, when the first float is in its second position and the second float is in its first position, air is trapped in the first chamber to maintain the liquid level in the first chamber at a level so as to maintain the first float in its second position, and wherein the inlet includes a nozzle with a diameter of more than 2 mm.

It will be understood that the functionality and advantages of the features of the liquid level control device of the first aspect of the invention and its embodiments corresponds mutatis mutandis to the corresponding features of the liquid level control device of the third aspect of the invention and its embodiments.

In a preferred embodiment of the invention the nozzle may have a diameter of at least 3 mm.

The inventor has found that the use of a nozzle larger than 2 mm results in an improved and more reliable flow of liquid via the inlet due to the reduction in likelihood of blockages caused by any particles in the liquid from the liquid source when compared to a nozzle having a diameter of 2 mm or less.

BRIEF DESCRIPTION OF THE DRAWINGS

Preferred embodiments of the invention will now be described, by way of non-limiting examples, with reference to the accompanying drawings in which.

DETAILED DESCRIPTION

Figure 1:
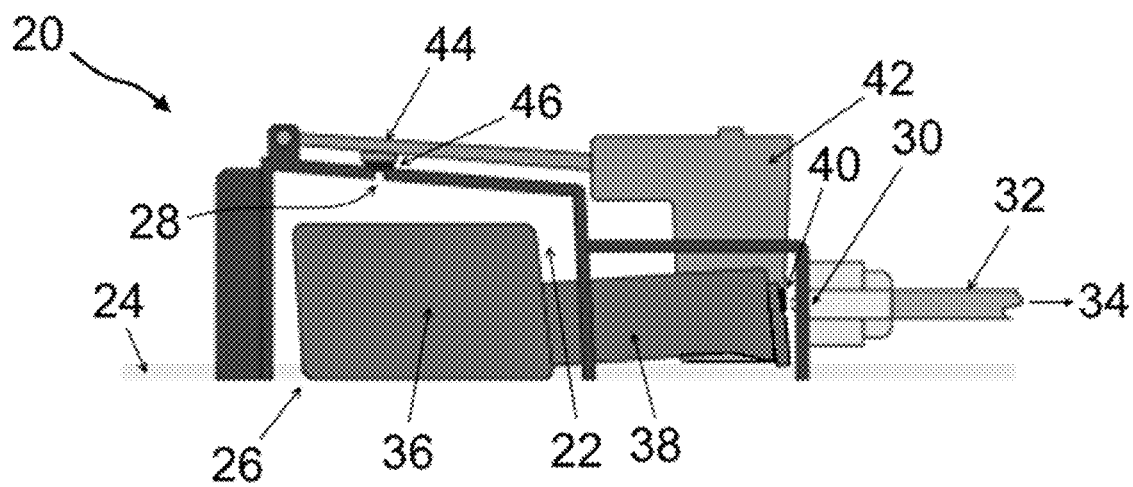
FIG. 1 shows schematically a liquid level control device according to an embodiment of the invention.

A liquid level control device according to an embodiment of the invention is shown in FIG. 1 and is designated generally by the reference numeral 20.

The liquid level control device 20 comprises a first chamber 22, a first flow controller, and a second flow controller.

In use, the liquid level control device 20 is located in a tray (not shown) containing water 24. A plant (not shown) is also placed inside the tray. Alternatively, if the plant cannot be placed inside the tray, the plant may be arranged to be in liquid communication with the tray by using a medium for transporting liquid from the tray to the plant.

An opening 26 extends across the base of the first chamber 22 to allow movement of water 24 between the first chamber 22 and the tray. A vent 28 is located in a ceiling of the first chamber 22 to allow egress of air from the first chamber 22. An inlet 30 is located in a side wall of the first chamber 22.

In use, the inlet 30 includes a nozzle connected via a hose 32 to a reservoir 34 that is positioned relative to the liquid level control device 20 such that the reservoir 34 supplies water to the inlet 30 by way of gravity pressure. The nozzle has a diameter of more than 2 mm to reduce the likelihood of blockages caused by any particles in the water from the reservoir 34 when compared to a nozzle having a diameter of 2 mm or less.

The first flow controller includes a first float 36 with a first hollow body. The first float 36 is located inside the first chamber 22, and is pivotally mounted relative to the first chamber 22. More specifically, a first arm 38 is located inside the first chamber 22, a distal end of the first arm 38 includes lugs extending laterally into receiving slots formed in side walls of the first chamber 22 such that the first arm 38 is pivotally mounted relative to the first chamber 22, and the first float 36 is attached to a proximal end of the first arm 38.

A first closure member 40 is located at the distal end of the first arm 38. The first arm 38 is arranged to position the first closure member 40 relative to the inlet 30 so that the first arm 38 may be pivoted to move the first closure member 40 to positively seat against the inlet 30 so as to close the inlet 30, and to move the first closure member 40 away from the inlet 30 so as to open the inlet 30.

The first float 36 is further arranged in the first chamber 22 such that, in use:

when the first float 36 is at a first position when the water level in the first chamber 22 is at or below a first predetermined level, the first float 36 positions the first closure member 40 to open the inlet 30 to allow water into the first chamber 22 via the inlet 30; and when the first float 36 is at a second, higher position when the water level in the first chamber 22 is at or above a second predetermined level, the first float 36 positions the first closure member 40 to close the inlet 30 to block water from entering into the first chamber 22 via the inlet 30.

The second flow controller includes a second float 42 with a second hollow body. The second float 42 is located above the first chamber 22, and is pivotally mounted relative to the first chamber 22. More specifically, a second arm 44 is located on top of the first chamber 22 such that it overlies the first chamber 22, a distal end of the second arm 44 includes lugs extending laterally to be received in slots formed on top of the first chamber 22 such that the second arm 44 is pivotally mounted relative to the first chamber 22, and the second float 42 is attached to a proximal end of the second arm 44.

A second closure member 46 is located between the distal and proximal ends of the second arm 44. The second arm 44 is arranged to position the second closure member 46 relative to the vent 28 so that the second arm 44 may be pivoted to move the second closure member 46 to positively seat against the vent 28 so as to close the vent 28, and to move the second closure member 46 away from the vent 28 so as to open the vent 28.

The second float 42 is further arranged such that, in use:

when the second float 42 is in a first position, the second float 42 positions the second closure member 46 to close the vent 28 to block air from flowing from the first chamber 22 via the vent 28 to escape to atmosphere; and when the second float 42 is in a second, higher position, the second float 42 positions the second closure member 46 to open the vent 28 to allow air to flow from the first chamber 22 via the vent 28 to escape to atmosphere.

Figure 2:
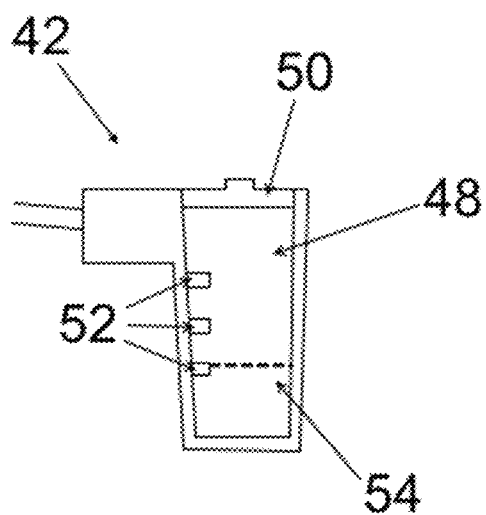
FIG. 2 shows a cross-sectional view of a second float of the liquid level control device of FIG. 1.

FIG. 2 shows a cross-sectional view of a second float of the liquid level control device of FIG. 1.

The second hollow body of the second float 42 includes an internal chamber 48 for storing a substance. A cover member in the form of a lid 50 is configurable to close and open the internal chamber 48 in order to selectively provide and block access to the internal chamber 48 from the exterior of the second hollow body. In this manner the internal chamber 48 is accessible from the exterior of the hollow body.

Preferably the hollow body is configured to seal the internal chamber 48 when the lid 50 is configured to block access to the internal chamber 48 from the exterior of the hollow body. Such sealing may be carried out by, for example, use of a separate seal between the lid 50 and hollow body, or dimensioning the lid 50 and hollow body to provide a press fit between the lid 50 and hollow body.

The ability to freely access the internal chamber 48 from the exterior of the hollow body permits the addition and removal of a substance into and from the internal chamber 48 even when the liquid level control device 20 is in its assembled state. This in turn results in the configuration of the second float 42 to have a variable weight modifiable through selective addition and removal of a substance into and from the internal chamber 48.

To facilitate the modification of the variable weight of the second float 42, a plurality of ribs 52 are vertically formed on the wall of the internal chamber 48. Each rib 52 acts as a marker to indicate the liquid level in the internal chamber

48. This allows the ribs 52 to function as visual indicators that indicate the amount of liquid to be stored in or removed from the internal chamber 48 in order to obtain a respective target change in weight of the second float 42.

Also, the arrangement of the ribs 52 on the wall of the internal chamber 48 effectively divides the internal chamber 48 into a plurality of sub-chambers, the size of each sub-chamber corresponding to a target amount of liquid to be stored in or removed from the corresponding sub-chamber to obtain a respective target change in weight of the second float 42.

The provision of the ribs 52 in the internal chamber 48 is advantageous in that it provides a user with a user with a reliable means of modifying the weight of the second float 42 to a target level, without requiring measuring equipment to determine the correct amount of substance to be stored in or removed from the internal chamber 48, or without resorting to a time-consuming trial and error approach.

FIGS. 3 to 6 illustrate the operation of the liquid level control device 20 of FIG. 1 to control the water level in the tray.

Figure 3:
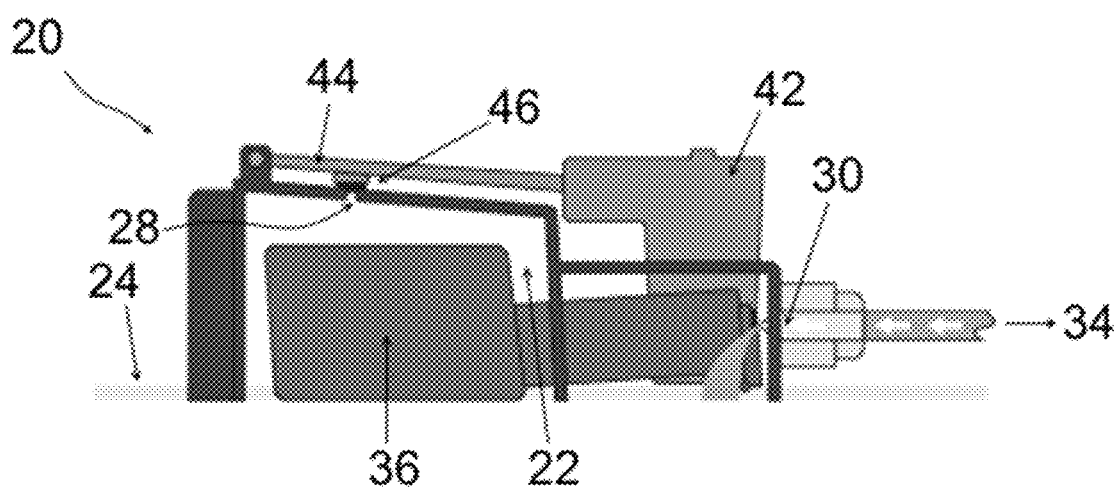
FIGS. 3 to 6 illustrate the operation of the liquid level control device of FIG. 1 to control the water level in a tray.

When the reservoir 34 is filled with water, the water travels through the hose 32 from the reservoir 34 to the inlet 30. The water then passes through the nozzle and into the first chamber 22 and tray. As the first chamber 22 and tray fills with water 24, air is trapped inside the first chamber 22 and around the first float 36, thereby causing it to try and rise. The air is trapped inside the first chamber 22 because the second float 42 is kept in its first position due to its weight, which in turn causes the second arm 44 to rest on top of the first chamber 22 and thereby positions the second closure member 46 to close the vent 28 to block air from flowing from the first chamber 22 via the vent 28 to escape to atmosphere. At this stage the water level in the first chamber 22 is at or below a first predetermined level, which means that the first float 36 is at a first position to allow the inlet 30 to remain open and continue allowing water into the first chamber 22, as shown in FIG. 3.

When water 24 is present in the tray, the plant will consume the water 24 from the tray.

Figure 4:
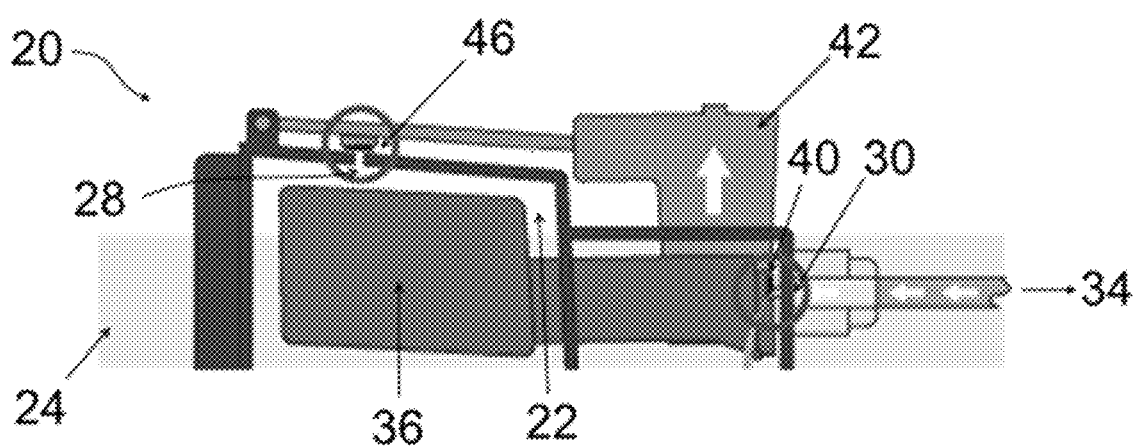

As the water level in the tray continues to increase, the water 24 in the tray will become sufficiently high to cause the second float 42 to rise from its first position. When the second float 42 reaches its second position, the second closure member 46 is positioned to open the vent 28 to allow the trapped air to flow from the first chamber 22 via the vent 28 to escape to atmosphere. This in turn allows the water level in the first chamber 22 to reach the second predetermined level and therefore the first float 36 to rise to its second position so that the first closure member 40 is positioned to close the inlet 30 to block liquid from entering into the first chamber 22 via the inlet 30. At this stage the water level in the tray is at a maximum level, as shown in FIG. 4.

Figure 5:
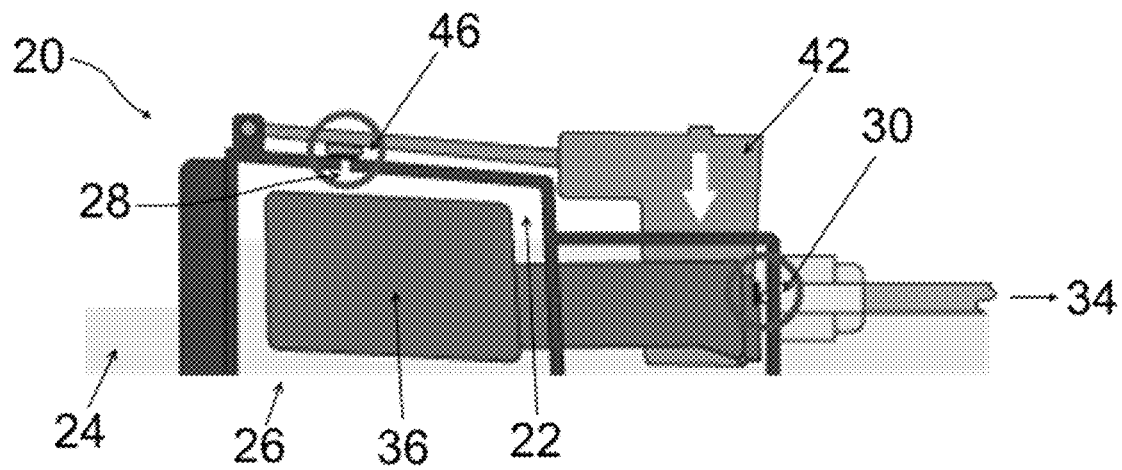

Thereafter, as the plant consumes the water 24 from the tray, the water level in the tray will drop from its maximum level. Such reduction in the water level in the tray lowers the second float 42 until it returns to its first position to position the second closure member 46 to close the vent 28 to block air from flowing from the first chamber 22 via the vent 28 to escape to atmosphere. The closure of the vent 28 together with the previous closure of the inlet 30 results in the formation of a partial vacuum inside the first chamber 22, which prevent 28s water inside the first chamber 22 from flowing via the opening 26 into the tray and thereby maintains the water level in the first chamber 22 at a level so as to maintain the first float 36 in its second position to keep the inlet 30 closed, as shown in FIG. 5.

Figure 6:
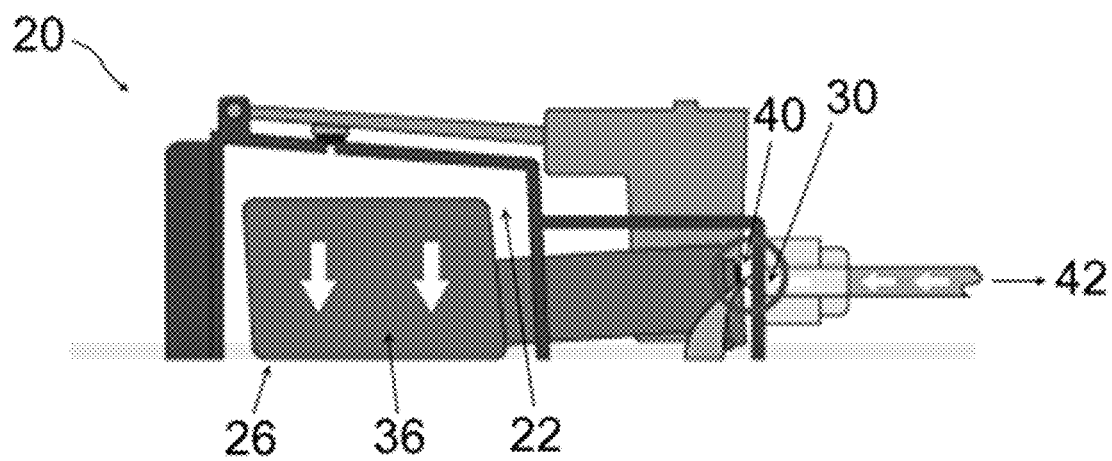

After the water 24 in the tray runs out due to consumption by the plant, the surface tension around the first chamber 22 breaks to allow the water trapped inside the first chamber 22 to be released via the opening 26 to the tray. This in turn lowers the water level in the first chamber 22 and thereby allows the first float 36 to return to its first position to position the first closure member 40 to reopen the inlet 30 to resume the flow of water into the first chamber 22, as shown in FIG. 6.

The above operation of the liquid level control device 20 ensures that the tray is not refilled with water 24 until all of the water 24 in the tray is used up, in order to ensure that the plant is not constantly sat in water 24. In this manner the liquid level control device 20 provides cyclic control over the water level in the tray, without requiring electricity, mains water pressure, pumps, and timers.

The cyclic control over the water level in the tray can be altered by modifying the functionality of the second flow controller. More specifically, the maximum water level in the tray can be altered by modifying the point at which the second closure member 46 is moved from its first position to its second position to open the vent 28. This is carried out by modifying the variable weight of the second float 42 through selective addition and removal of a substance into and from the internal chamber 48.

To illustrate the modification of the functionality of the second flow controller, the substance is selected as water 54. It will be appreciated however that, in addition to or in place of water 54, at least one other liquid substance and/or at least one solid substance may be selectively added and removed into and from the internal chamber 48 to modify the variable weight of the second float 42.

Water 54 is added into the internal chamber 48 up to a desired water level indicated by one of the plurality of ribs 52 in order to achieve a target increase in weight of the second float 42. The increase in weight of the second float 42 means that a higher water level in the tray will be reached before the second float 42 can be moved from its first position to its second position to open the vent 28. Therefore, in this manner, increasing the weight of the second float 42 results in an increase in the maximum water level in the tray.

Thereafter, if the maximum water level in the tray is required to be lower while remaining higher than the original maximum water level in the tray, some of the water 54 in the internal chamber 48 can be removed until the water level in the internal chamber 48 reaches a lower level indicated by a different rib 52 in order to achieve a target decrease in weight of the second float 42. The reduction in weight of the second float 42 results in a reduction of the maximum water level in the tray.

If it becomes necessary to return to the original maximum water level in the tray, all of the remaining water 54 can be removed from the internal chamber 48 in order to return the second float 42 to its original weight.

The configuration of the second float 42 in the foregoing manner (i.e. to have a variable weight modifiable through selective addition and removal of water 54 into and from the internal chamber 48) therefore permits modification of the variable weight of the second float 42 through addition and removal of water into and from the internal chamber 48. This in turn allows the modification of the functionality of the second flow controller in order to modify the cyclic control over the water level of the tray, thus enabling the liquid level control device 20 to increase the controllable range of water level in the tray in order to suit a range of plants with different water consumption requirements. This extends the capability of the liquid level control device 20 with zero or minimal increase in the number of parts used, thus minimising overall cost and increasing reliability.

In addition the aforementioned modification of the variable weight of the second float 42 can be advantageously carried out when the liquid level control device 20 is located in-situ and when the liquid level control device 20 is in its assembled state, i.e. there is no requirement to disassemble the components of the liquid level control device 20 in order to modify the functionality of the second float 42. This is particularly beneficial when it is desirable to minimally interrupt the operation of the liquid level control device 20 to control the water level in the tray, or when it is difficult to remove the liquid level control device 20, e.g. because the liquid level control device 20 is integrated into a larger system, such as a casing.

Furthermore configuring the second float 42 in the foregoing manner (i.e. to have a variable weight modifiable through selective addition and removal of water 54 into and from the internal chamber 48) not only means that there is no requirement to increase the overall size of the liquid level control device 20 to accommodate any added substance, unlike the case if the added substance is attached to the exterior of the second float 42, but also ensures the maintenance of the modified weight of the second float 42 through reliable storage of any added substance in the internal chamber 48.

The above advantages with a liquid level control device 20 associated with a second float configured to have a variable weight cannot be achieved with a liquid level control device based on a second float configured to have a fixed weight.

Configuring the second float to have a fixed weight would limit the functionality of the second flow controller and thereby limit the range of water level in the tray that is controllable by the liquid level control device. Thus such a liquid level control device would be limited to use with a limited range of plants. Under such circumstances, in order to meet a different water consumption requirement of a different plant, it would be necessary to either manufacture a completely new second float or a completely new liquid level control device, which would not be as cost-efficient as the invention. Alternatively multiple liquid level control devices could be utilised to meet a different water consumption requirement of a different plant, but the use of multiple liquid level control devices greatly increases the number of parts which in turn increases overall cost and reduces reliability.

In addition configuring the second float to have a fixed weight would require the disassembly of the liquid level control device and/or the removal of the liquid level control device from the tray so as to enable the installation of a different second float with a different fixed weight in order to meet a different water consumption requirement of a different plant.

Although the feature of configuring the second float to have a variable weight and the feature of configuring the nozzle to have a diameter of more than 2 mm are shown as part of the same embodiment shown in FIG. 1, it will be appreciated that both features can be used separately in different embodiments.

The invention claimed is:

1. A liquid level control device for location in a vessel to control a liquid level in the vessel, the liquid level control device comprising:
 - a first chamber including: an opening to allow movement of liquid between the first chamber and the vessel; a vent to allow egress of air from the first chamber; and an inlet connectable to a liquid source;
 - a first flow controller including a first float arranged in the first chamber such that the flow of liquid into the first chamber raises the first float and displaces air in the first chamber via the vent, the first flow controller including a first closure member movable to selectively close and open the inlet, the first float further arranged in the first chamber such that, in use, when the first float is at a first position when the liquid level in the first chamber is at or below a first predetermined level, the first float positions the first closure member to open the inlet to allow liquid into the first chamber via the inlet, and when the first float is at a second position when the liquid level in the first chamber is at or above a second predetermined level, the first float positions the first closure member to close the inlet to block liquid from entering into the first chamber via the inlet; and
 - a second flow controller including a second float and further including a second closure member movable to selectively close and open the vent, the second float arranged such that, in use, when the second float is in a first position, the second float positions the second closure member to close the vent to block air from flowing from the first chamber via the vent to escape to atmosphere, and when the second float is in a second position, the second float positions the second closure member to open the vent to allow air to flow from the first chamber via the vent to escape to atmosphere,
 - wherein the first and second floats are arranged such that, in use, when the first float is in its second position and the second float is in its first position, air is trapped in the first chamber to maintain the liquid level in the first chamber at a level so as to maintain the first float in its second position, and
 - wherein the second float includes a hollow body with an internal chamber for storing a substance, the hollow body configured so that the internal chamber is accessible from an exterior of the hollow body to permit addition and removal of the substance into and from the internal chamber, the second float configured to have a variable weight modifiable through selective addition and removal of the substance into and from the internal chamber,
 - wherein the internal chamber of the second float is divided into a plurality of sub-chambers, each sub-chamber of the plurality of sub-chambers having a respective size the target amount corresponding to a target amount of substance to be stored in or removed from the corresponding sub-chamber to obtain a respective target change in weight of the second float.

2. A liquid level control device according to claim 1 wherein the substance is a solid or a liquid.

3. A liquid level control device according to claim 1 further including the substance stored in the internal chamber of the hollow body of the second float, the substance configured to be wholly or partly removable from the internal chamber to reduce the weight of the second float.

4. A liquid level control device according to claim 1 wherein the second float includes a cover member configurable to selectively provide and block access to the internal chamber from the exterior of the hollow body.

5. A liquid level control device according to claim 4 wherein the hollow body is configured to seal the internal chamber when the cover member is configured to block access to the internal chamber from the exterior of the hollow body.

6. A liquid level control device according to claim 1 wherein the second float includes at least one visual indicator corresponding to each sub-chamber of the plurality of sub-chambers having a respective size the target amount of substance to be stored in or removed from the internal chamber to obtain the respective target change in weight of the second float.

7. A liquid level control device according to claim 6, wherein the at least one visual indicator corresponds to a target amount of liquid to be stored in or removed from the internal chamber to obtain the respective target change in weight of the second float.

8. A liquid level control device according to claim 6, wherein the at least one visual indicator is formed in or on a wall of the internal chamber.

9. A liquid level control device according to claim 6, wherein the at least one is in the form of a protrusion formed on a wall of the internal chamber.

10. A method of configuring a liquid level control device for location in a vessel to control a liquid level in the vessel, wherein the method comprises the steps of:
providing a level control device, the level control device having
a first chamber including: an opening to avow movement of liquid between the first chamber and the vessel; a vent to allow egress of air from the first chamber; and an inlet connectable to a liquid source;
a first flow controller including a first float arranged in the first chamber such that the flow of liquid into the first chamber raises the first float and displaces air in the first chamber via the vent, the first flow controller including a first closure member movable to selectively close and open the inlet, the first float further arranged in the first chamber such that, in use, when the first float is at a first position when the liquid level in the first chamber is at or below a first predetermined level, the first float positions the first closure member to open the inlet to avow liquid into the first chamber via the inlet, and when the first float is at a second position when the liquid level in the first chamber is at or above a second predetermined level, the first float positions the first closure member to close the inlet to block liquid from entering into the first chamber via the inlet; and
a second flow controller including a second float and further including a second closure member movable to selectively close and open the vent, the second float arranged such that, in use, when the second float is in a first position, the second float positions the second closure member to close the vent to block aft from flowing from the first chamber via the vent to escape to atmosphere, and when the second float is in a second position, the second float positions the second closure member to open the vent to allow air to flow from the first chamber via the vent to escape to atmosphere,
wherein the first and second floats are arranged such that, in use, when the first float is in its second position and the second float is in its first position, air is trapped in the first chamber to maintain the liquid level in the first chamber at a level so as to maintain the first float in its second position, and
wherein the second float includes a hollow body with an internal chamber for storing a substance, the hollow body configured so that the internal chamber is accessible from an exterior of the hollow body to permit addition and removal of the substance into and from the internal chamber, the second float configured to have a variable weight modifiable through selective addition and removal of the substance into and from the internal chamber,
wherein the internal chamber of the second float is divided into a plurality of sub-chambers, each sub-chamber of the plurality of sub-chambers having a respective size corresponding to a target amount of substance to be stored in or removed from the corresponding sub-chamber to obtain a respective target change in weight of the second float;
configuring the hollow body so that the internal chamber is accessible from the exterior of the hollow body to permit addition and removal of the substance into and from the internal chamber;
configuring the second float to have a variable weight modifiable through selective addition and removal of the substance into and from the internal chamber;
accessing the internal chamber from the exterior of the hollow body; and
modifying the weight of the second float by adding or removing the substance into or from at least one sub-chamber of the plurality of sub-chambers in an amount corresponding to a size of the at least one sub-chamber.

11. A method according to claim 10 wherein the substance is a solid or a liquid.

12. A method according to claim 10 including the step of configuring a cover member to selectively provide and block access to the internal chamber from the exterior of the hollow body.

13. A method according to claim 10 wherein the second float includes at least one visual indicator corresponding to the target amount of substance to be stored in or removed from the internal chamber to obtain the respective target change in weight of the second float, and the method includes the step of: modifying the weight of the second float by adding or removing the substance into or from the internal chamber in an amount corresponding to the at least one visual indicator.

14. A method according to claim 13 wherein the at least one visual indicator corresponds to a target amount of liquid to be stored in or removed from the internal chamber to obtain the respective target change in weight of the second float, and the method includes the step of: modifying the weight of the second float by adding or removing liquid into or from the internal chamber in an amount corresponding to at least one visual indicator.

15. A method according to claim 13 wherein the at least one visual indicator is formed in or on a wall of the internal chamber.

16. A method according to claim 13 wherein the at least one visual indicator is in the form of a protrusion formed on a wall of the internal chamber.

* * * * *